United States Patent [19]

Thut

[11] 4,339,250

[45] Jul. 13, 1982

[54] FRESH AIR FOUNTAIN AIR FILTER ARRANGEMENT

[76] Inventor: Timothy T. Thut, 2940 Neilson Way, #102, Santa Monica, Calif. 90405

[21] Appl. No.: 169,714

[22] Filed: Jul. 17, 1980

[51] Int. Cl.³ .................. B01D 46/02; B01D 50/00
[52] U.S. Cl. ................................. 55/316; 55/383; 55/385 A; 55/387; 55/467; 98/33 R; 98/36
[58] Field of Search ............... 55/276, 383, 316, 387, 55/467, 316, 470–473, 486, 487, 410, 498, DIG. 29, 385 A; 98/33 R, 36, 115 LH

[56] References Cited

U.S. PATENT DOCUMENTS

| | | | |
|---|---|---|---|
| 2,214,737 | 9/1940 | Dauphinee | 55/387 |
| 3,347,025 | 10/1967 | Wiley | 55/473 |
| 3,513,643 | 5/1970 | Tarala | 55/487 |
| 3,523,409 | 8/1970 | Patterson | 55/471 |
| 3,721,067 | 3/1973 | Agnew | 55/473 |
| 3,850,598 | 11/1974 | Boehm | 98/33 A |
| 4,055,112 | 10/1977 | Larkfeldt | 98/36 |
| 4,191,543 | 3/1980 | Peters | 98/40 D |
| 4,227,904 | 10/1980 | Kasmark et al. | 55/316 |

FOREIGN PATENT DOCUMENTS

| | | | |
|---|---|---|---|
| 1619863 | 8/1970 | Fed. Rep. of Germany | 55/316 |
| 2362343 | 4/1978 | France | 55/467 |
| 1345155 | 1/1974 | United Kingdom | 55/487 |
| 1346762 | 2/1974 | United Kingdom | 55/316 |

Primary Examiner—Bernard Nozick
Attorney, Agent, or Firm—Finkelstein, McGuire & Thut

[57] ABSTRACT

An air filter arrangement for cleaning the ambient air in enclosed air spaces. Granular activated carbon and two particulate air filters provide the actual air filtration media to remove both gaseous and particulate air impurities. The structure of the air filter retains the particulate filters in position by friction. One of the particulate filters is placed between the granular activated carbon and the air filter metal retaining screen without intervening support or protection from the activated carbon. A fountain of fresh air is provided by directing the exhaust of the air blower toward the ceiling of the room thereby creating a low pressure area surrounding the air filter near the floor. Dirty air near the floor migrates toward the low pressure area and enters the air filter where it is cleaned. The remaining dirty air in the room sinks as a pool mass slowly toward the floor where it eventually enters the filter. Only an insignificant portion of the vertical clean air fountain mixes with the dirty air remaining in the room.

6 Claims, 3 Drawing Figures

FRESH AIR FOUNTAIN AIR FILTER ARRANGEMENT

BACKGROUND OF THE INVENTION

1. Field of the Invention

This invention relates to the air filtration art, and, more particularly, to a self contained unit for providing air filtration of ambient air in enclosed spaces such as rooms and vehicles.

2. Description of the Prior Art

Air pollution has existed since the beginning of man in the form of dust, smoke, pollen, odors, viruses, molds, and bacteria. In the past only hay fever sufferers were seriously inconvenience by air pollution. Now in our increasingly crowded environments pollution levels of all the above pollutants have increased along with new additions such as insecticides, chemicals, and smog. It is no longer possible to simply open a window to let clean air enter. The outside air is usually dirtier than the inside air. In addition, cooling and heating energy costs have increased dramatically to the point that windows must be kept closed in order to retain the cooled or heated air inside no matter what pollutants may remain inside.

Generally, almost all present air filtration methods are incorporated as a part of central air conditioning and/or heating systems. Filtration media is placed in the return air ducts which travel from the floor or baseboard of a room to the cooling and heating equipment. Conditioned air is then returned to the room through ducts near the ceiling. The air filtration media placed in these systems is almost universally of the fiberglass furnace type or foam air conditioner type. Neither removes particulates below the size of lint and dust. Homes without forced air heating and/or cooling usually do not have any air filtration equipment at all.

Some central systems have electronic air cleaners installed which remove virtually all particulates including smoke, pollen, dust, viruses, molds, and bacteria but they do not remove gaseous pollutants such as odors, smog, and chemicals. In addition, electronic air cleaners create ozone which is irritating to many parts of the human body as well as plants and animals.

A few thousand homes in the Los Angeles, Calif., area have activated carbon air filters which remove gaseous air pollutants by the adsorbtion properties of the activated carbon. Activated carbon for air filtration is used in other locations only for highly specialized purposes such as to clean the air in submarines, space capsules, high flying aircraft, computer rooms, and in special industrial clean room situations including apple and flower storage facilities. Activated carbon is also the major active ingredient in gas masks.

Room air cleaners which plug into wall electrical outlets generally incorporate small electronic air cleaners followed by activated carbon filters. Most of the ozone produced by the units is removed by the carbon filters. These air cleaners are either placed on tables or sit on the floor with the clean air being ejected out of the back of the units at approximately waist height in a horizontal air flow pattern. The clean air mixes with the dirty air with no cyclical air flow pattern being achieved as is found in central air conditioning and heating systems. Eventually most of the pollutants in the ambient air in a given enclosed air space do pass through the electronic air cleaner where they are trapped.

Several room air cleaner systems have been developed which utilize activated carbon either alone or in conjunction with high efficiency particulate filters to clean the air. All of these units exhaust the air out of the back or side in a horizontal pattern thereby mixing the clean air with the dirty air in the room. The high efficiency particulate air filters in these units have approximately the same efficiency range as do the electronic air cleaners. The great advantage of the activated carbon units is that the proportion of carbon in these units is a multiple of that in the primarily electronic air cleaners discussed immediately above. The activated carbon air filters included with the electronic air cleaners are designed to simply bring the ozone produced by the electronic air cleaners down to an acceptable level. No extra activated carbon is included to remove gaseous pollutants other than ozone.

Conversely, many activated carbon room filter units have only activated carbon filtration media and no particulate filtration capability at all. These units are primarily found in hospitals where odor is a problem and in flower shops where plant decay must be minimized.

All activated carbon room filter units that do have particulate filters have them as separate filters located apart from the activated carbon. The usual configuration is to place a furnace type particle filter in front of the activated carbon media. One unit made by Aireox Research in Riverside, Calif., wraps a high efficiency particulate filter around the outside and inside of a cylinder containing activated carbon and retains the filter material in place by the use of cardboard and staples. The resulting arrangement is expensive to manufacture and must be thrown away when it is dirty. Another form of air cleaner has recently appeared on the market in the form of air ionizers. The ionizers emit negative air ions which discharge when they hit floating particulate matter which usually carries a positive charge. When the particulate matter become neutral in charge, it loses its ability to remain floating in the air and falls to the floor. The major problems with air ionizers as air cleaners is that they are effective only for limited areas and the pollutants which do fall out of the air simply fall to horizontal surfaces where they may be easily stirred up again and reintroduced into the air.

Thus, all existing room air filters have severe deficiencies. All known prior art air filter units other than air ionizers for use in rooms disperse the clean air in a horizontal pattern which mixes readily with the surrounding dirty air. Not only does this arrangement delay the cleaning of the air but it also blows particles off horizontal surfaces thereby reintroducing them into the air again. The activated carbon room units that do have particulate filters make do with existing expensive particulate filter assemblies or attach them in expensive configurations separated from the activated carbon.

SUMMARY OF THE INVENTION

Accordingly, it is the primary object of the invention to provide an improved air filter arrangement.

It is a further object of the invention to provide a self contained fresh air fountain air filter for cleaning ambient air in enclosed air spaces.

It is a further object of the invention to provide an air filter having an exhaust which minimizes the mixing of the clean air with the dirty air.

It is a further object of the invention to provide an air filter which causes a low pressure area near the floor of an enclosed space by removing air from that area and shooting it to the ceiling in a narrow vertical stream.

It is a further object of the invention to provide an air filter which removes dirty air from the bottom of a room and causes the remaining air in the room to slowly sink to the floor as a pool without mixing with other layers of air in the room.

It is another object of the invention to provide an air filter in a self contained unit for removing both particulate and gaseous air pollutants.

It is another object of the invention to provide an air filter which combines an activated carbon media with a mechanical air filter media.

It is another object of the invention to provide an air filter which combines a granular activated carbon media with a fiberglass high efficiency particulate air filter media without an intervening support.

These and other objects of the present invention are realized in a preferred embodiment of the present invention in which two concentric cylinders of perforated metal are capped at either end by metal rings. Each ring has an outer lip and an inner lip bent at 90° to the plane of the surface of the ring. The outer concentric cylinder fits inside the outer lips of the two metal rings at either end of the cylinders and the inner concentric cylinder fits inside the inner lips of the two metal rings.

Positioned against the inside of the outer concentric cylinder is a high efficiency particulate air filter fabricated of fiberglass. This particulate air filter is much like furnace type filter fiberglass air filter media except that the fibers are much smaller and the mat is only approximately ¼ inch thick.

The remainder of the space between the concentric cylinders is filled with granular or pelletized actived carbon. The activated carbon is retained in the space between the concentric cylinders by the two metal rings at either end of the concentric cylinders. The activated carbon presses against the particulate air filter and retains it in position against the inside of the outer cylinder. The preferred form of activated carbon has a mesh size ranging between 4 and 12 and an activtity of approximately 50% to 60% $CCl_4$ following the standard test conditions of MIL-C-17605B.

No appreciable collapse of the fiberglass particulate air filter occurs apparently because of the density of the high efficiency type of fiberglass particulate air filter media. Less dense types of fiberglass air filter media would tend to collapse and become unuseable under similar circumstances. The preferred fiberglass particulate air filter media has an efficiency ranging between 85% and 95% following the procedures of the American Society of Heating, Refrigeration, and Air Conditioning Engineers test 52–68.

Surrounding the outer surface of the outer concentric cylinder is a cloth which serves the dual purpose of providing decoration for the air filter and a prefilter for the particulate air filter inside. Foam backed upholstery cloth provides the ideal prefilter because the small holes in the foam trap particulate matter better than does cloth which does not have foam backing.

Covering the top and bottom of the cylinders are a top pan and a bottom pan. The pans are circular and have lips projecting at 90° from the plane of their surfaces. An air blower of appropriate size to fit inside the inner concentric cylinder is attached to the inside of the top pan. Exhaust holes through the top pan allow air to pass from the blower exhaust through the top pan and out into the room or enclosed space. The bottom pan serves to close off the end of the cylinders opposite the top pan.

Preferably the air blower is powered by an electric motor. When the blower is turned on it creates a vacuum inside the cylinder thereby drawing air through the three air filtration media. The air first enters the cloth media, then passes through the outer concentric cylinder into the high efficiency air filtration media, through the activated carbon media, and out the inner concentric cylinder into the air space inside the inner cylinder. The air is then drawn into the blower where it is exhausted into the space outside the air filter unit.

The selection of a cylindrical configuration for the air filtrations section is preferred because optimization of surface area of the air filtration media is thereby achieved at minimum cost. Other configurations for the air filtration media section could be used including panels and convoluted curtain walls.

Placement of the blower internal to the cylinders is also preferred to minimize noise and create a more esthetically pleasing product. All other known cylindrical air filter units place the blower outside the cylinders where the noise that is created by their operation is readily transmitted to the room environment. Additionally, the placement of the blower outside the cylinders exposes it to view.

The final reason for placing the blower inside the cylinder is a result of the discovery of the fact that the optimum position for the exhausting of the blower is vertical toward the ceiling of the enclosed space. Numerous experiments with exhaust position showed that all but a vertical position created a mixing of the clean air leaving the air filter unit with the dirty air remaining in the room.

Particles in the air will tend to slowly fall out of the air if no stirring occurs. A closed room where no outside air currents can enter is such a case. The air near the floor will therefore contain the greatest number of particles with air above the floor gradually becoming cleaner until it is the cleanest at the ceiling. The particles in the air fall out of the air because of gravity. An analogy can be made to a swimming pool containing dirty water. The dirt will slowly settle to the bottom of the pool as long as the water is not stirred.

Filtration of both the air pool in a room and the water pool in a swimming pool should take place starting at the bottom if gravity is to be utilized to make the process as efficient as possible. This is the reason that swimming pool filtration systems draw the dirty water out of the bottom of the pool and replace it at the top with the clean water. The air in a closed room is no different from a pool of water in this regard.

However, no known room air filtration units have made any attempt to take advantage of the gravitational separation of the particulate matter from the air. Instead, they exhaust the clean air in primarily horizontal patterns which immediately cause the clean air to mix with the dirty air. In addition, the horizontal exhausts blow dirt off of horizontal surfaces and reintroduce the particles into the pool of air in the room.

By directing the exhaust air vertically toward the ceiling as is done in the present invention, the disturbance of the ambient air pool is minimized. All high velocity air is directed toward the ceiling where it splashes off of the cleanest surface in the room. At the same time, the pool of air in the room sinks slowly to the floor as the air filter unit removes the dirty air from the floor. All suspended particles in the air are, thus, encouraged to fall to the floor by both the action of gravity and the velocity of the falling air.

BRIEF DESCRIPTION OF THE DRAWINGS

The above and other embodiments of the present invention may be more fully understood in the following detailed description taken together with the accompanying detailed drawings wherein similar reference characters refer to similar elements throughout and in which.

DESCRIPTION OF THE PREFERRED EMBODIMENTS

Figure 1:
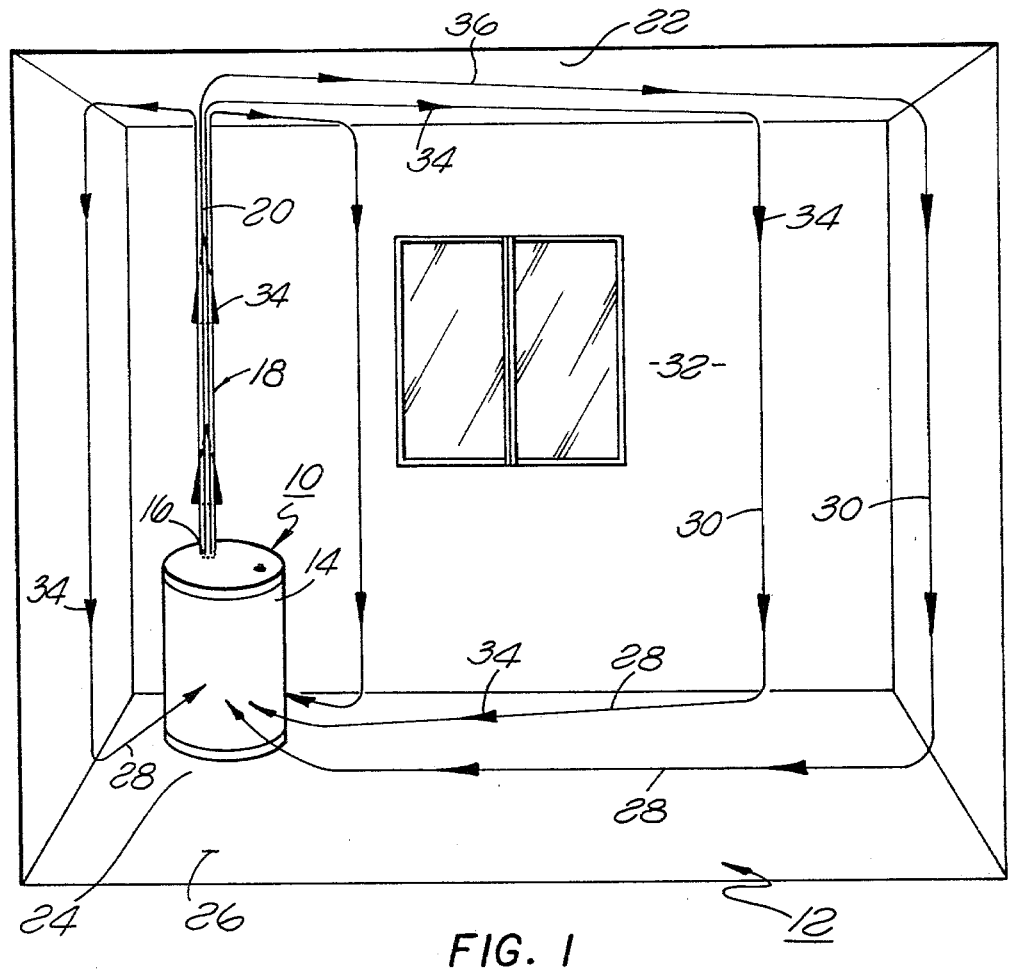
FIG. 1 is a perspective view of the fresh air fountain air filter arrangement installed in a room and in operation.

Referring now to the various figures of the drawing, there is illustrated in FIG. 1 a perspective view of the fresh air fountain air filter arrangement, generally designated 10, installed in a room 12 and in operation. Air filter arrangement 14 has a vertical air outlet 16 allowing exhaust air 18 to initiate an air stream 20 toward ceiling 22. Low pressure area 24 is created on floor 26 surrounding air filter arrangement 14 by the action of air filter arrangement 14 in blowing the exhaust air 18 toward ceiling 22. Dirty air 28 migrates into low pressure area 24 and then into air filter arrangement 14. All of the remaining dirty ambient air 30 in the enclosed space 32 settles in a pool to floor 26 for cleaning without any part of air stream 20 mixing with more than an insignificant portion of the dirty ambient air 30 in the enclosed space 32. Arrows 34 indicate the direction of movement of air around room 12 caused by air filter arrangement 14. Air stream 20 initially flows to ceiling 22 where it splashes against ceiling 22 and is dispersed in all directions. Some clean air 36 travels as far as walls 38 where the clean air 36 gradually settles and mixes with the dirty ambient air 30. The dirty ambient air 30 gradually settles to floor 26 where it migrates back to air filter arrangement 14.

Figure 2:
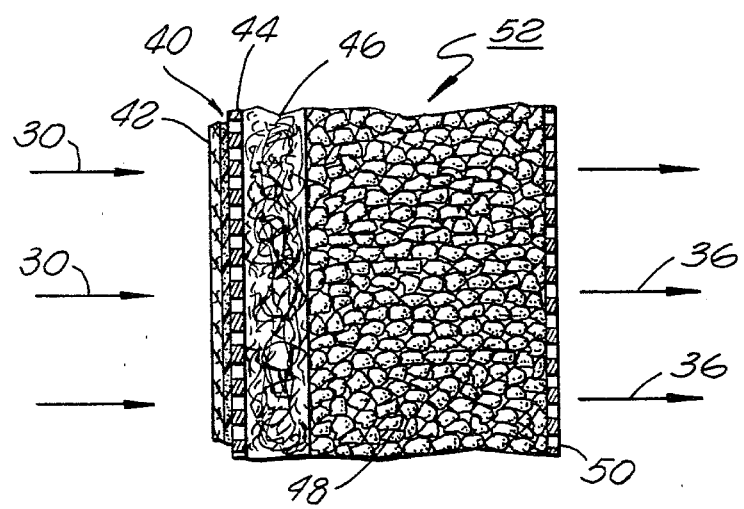
FIG. 2 is a sectional view through the wall of the air filter arrangement.

FIG. 2 is a sectional view through wall 40 of air filter arrangement 14 of FIG. 1. Dirty ambient air 30 enters air filter arrangement 14 at second particulate filter 42. The initial cleaning of dirty ambient air 30 occurs in the passage through second particulate filter 42. Second particulate filter 42 is preferably a cloth having a foam backing such as is found in upholstery materials. The cloth itself traps large dust particles such as dust and lint and the foam backing, if it is present, traps additional large particulate air pollutants. The cloth provides another function on air filter arrangement 14 by creating an attractive outer appearance for air filter arrangement 14.

The partially cleaned air then passes through the perforations in the perforated metal or plastic of outer air filter media retainer 44. Outer air filter media retainer 44 creates a rigid structure for the construction of air filter arrangement 14.

The partially cleaned air then passes into particulate filter 46. Particulate filter 46 is preferably fabricated of fiberglass high efficiency media having a filter efficiency of between 85% and 95% according to ASHRAE test 52-68. Particulate filter 46 removes virtually all particulate air pollutants including smoke, pollen, dust, viruses, molds, and bacteria.

The partially cleaned air passes through particulate filter 46 into activated carbon 48. Activated carbon 48 is preferably of a granular form having a mesh size ranging from 4 to 12 and an activity of 50% to 60% $CCl_4$ by weight according to standard test conditions of MIL-C-17605B. Activated carbon removes gaseous air pollutants from the partially cleaned air including odors and smog. When the air passes through activated carbon 48 and reaches inner air filter media retainer 50, it becomes clean air 36. Virtually all air pollutants of both particulate and gaseous types are removed from the air.

Together, second particulate filter 42, outer air filter media retainer 44, particulate filter 46, activated carbon 48, and inner filter media retainer 50 comprise air filtration media 52 of air filter arrangement 14. Activated carbon 48 retains particulate filter 46 in place against outer air filter media retainer 44 without any intervening support or separation. Particulate filter 46 is not crushed by activated carbon 48 because of the high density of high efficiency particulate filter 46.

Figure 3:
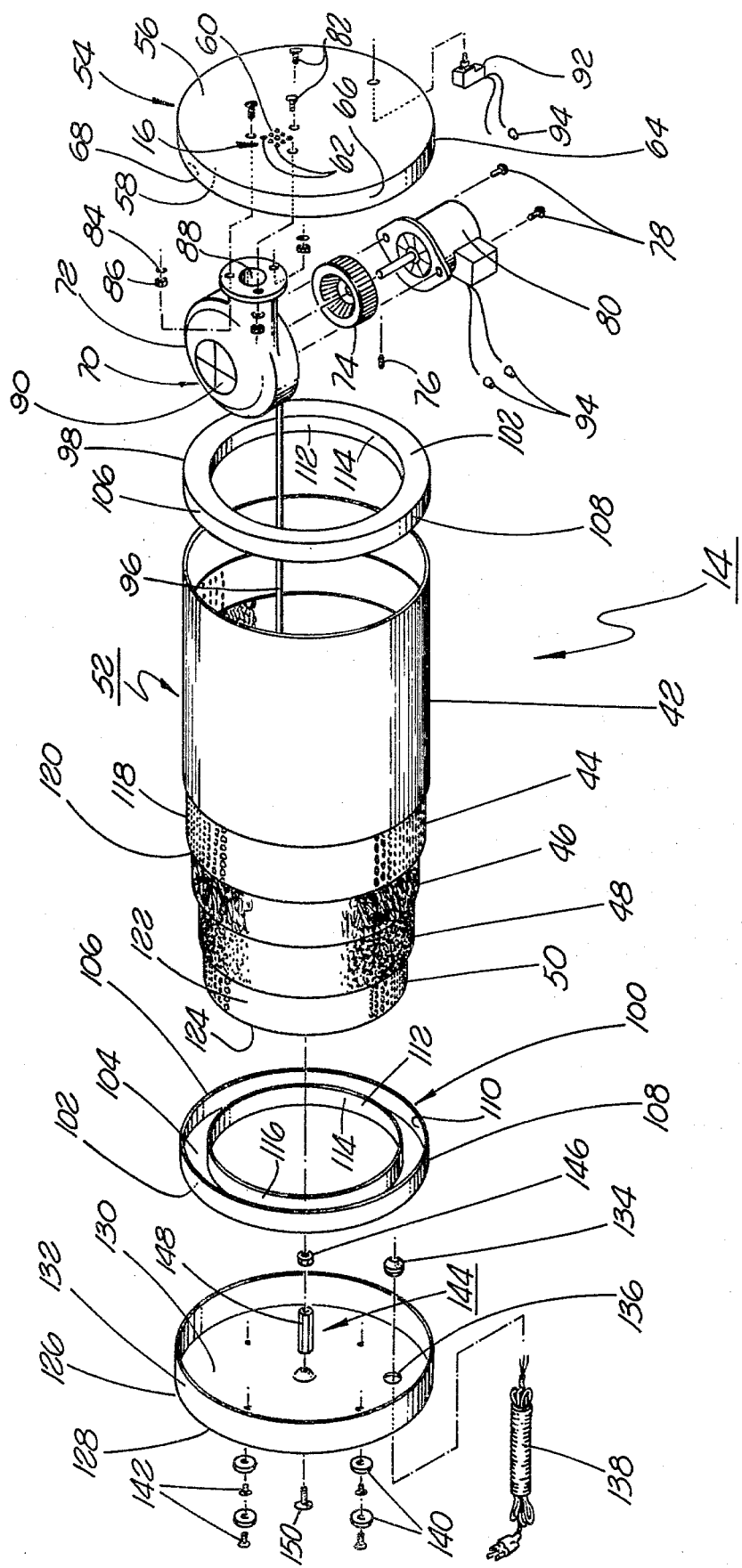
FIG. 3 is an exploded view of the air filter arrangement.

FIG. 3 is an exploded view of the air filter arrangement 14. Top member 54 is a pan having a first outer surface 56, a first inner surface 58 spaced transversely from the first outer surface 56, first walls 60 between the first outer surface 56 and the first inner surface 58 defining first apertures 62 through said top member 54. First apertures 62 together comprise vertical air outlet 16. A first outer lip 64 is formed at 90° to the plane of first outer surface 56. The first outer lip 64 has a second outer surface 66 and a second inner surface 68 spaced laterally from the second outer surface 66.

Air blower 70 comprised of a blower shell 72, blower wheel 74, set screw 76, motor attaching screws 78, and motor 80 is attached to top member 54 by bolts 82, washers 84, and nuts 86. Air blower 70 exhausts through exhaust port 88 which in turn exhausts through first apertures 62 of top member 54. Air enters air blower 70 through inlet port 90. Switch 92 passes through top member 54 to provide a method for turning on air blower 70. Switch 92 is attached to motor 80 by wire connectors 94. Rod 96 attaches air blower 70 to the remainder of air filter arrangement 14 as is discussed more fully below.

Top positioning member 98 is a ring which caps the top of air filtration media 52. Top positioning member 98 is identical to bottom positioning member 100 which caps the bottom air filtration media 52. Air filtration media 52 comprises second particulate filter 42, outer air filter media retainer 44, particulate filter 46, activated carbon 48, and inner filter media retainer 50.

Top and bottom positioning members 98 and 100 have third outer surface 102, third inner surface 104 spaced transversely from the third outer surface 102, and second outer lip 106 at 90° to the plane of the third outer surface 102. Second outer lip 106 has a fourth outer surface 108 and a fourth inner surface 110 spaced laterally from the fourth outer surface 108.

Top and bottom positioning member 98 and 100 also have inner lip 112 at 90° to the plane of third outer surface 102. Inner lip 112 has fifth outer surface 114 and fifth inner surface 116 spaced laterally from fifth outer surface 114.

Outer air filter media retainer 44 has seventh outer surface 118 and seventh inner surface 120 spaced laterally from the seventh outer surface 118. Inner filter media retainer 50, likewise, has eighth outer surface 122 and eighth inner surface 124 spaced laterally from the eighth outer surface 122. Both outer and inner air filter media retainers 44 and 50 are preferably fabricated of perforated metal or plastic.

Bottom member 126 is a pan and is identical to top member 54 in most respects. The major difference between bottom member 126 and top member 54 is that top member 54 has first apertures 62 to allow air from air blower 70 to exhaust outside air filter arrangement 14. Bottom member 126 has sixth outer surface 128, sixth inner surface 130 spaced transversely from the sixth outer surface 128 and third outer lip 132 at 90° to the plane of the sixth outer surface 128.

Grommet 134 fits into aperture 136 to protect electrical cord 138 where it passes through bottom member 126. Electrical cord 138 attaches to motor 80 and switch 92 to provide electricity for the operation of air blower 70. Rubber bumpers 140 are attached to sixth outer surface 128 of bottom member 126 by screws 142 to provide short legs for air filter arrangement 14 when it is positioned vertically. Rod 96 from air blower 70 passes through the center of air filtration media 52 and provides attaching means 144 for retaining air blower 70 to bottom member 126. Lock nut 146, coupler 148, screw 150, and rod 96 comprise the preferred embodiment of attaching means 144.

Bottom member 126, top member 54, and air filtration media 52 which extends from top member 54 to bottom member 126 together form a cavity containing air blower 70.

The preferred embodiment of the present invention illustrated in FIGS. 1 and 3 is cylindrical in configuration. Outer and inner air filter media retainers 44 and 50 are cylindrical and equidistant from each other. A uniform bed thickness of activated carbon 48 and particulate filter 46 is, thus, provided. First outer lip 64 of top member 54, second outer lip 106 of top and bottom positioning members 98 and 100, third outer lip 132 of bottom member 126, and inner lip 112 of top and bottom positioning members 98 and 100 are, consequently, also cylindrical.

Other configurations could be utilized for air filter arrangement 14 such as square, cube, or convoluted curtain wall. However, the cylindrical configuration is preferred because of the optimization of the surface area of the air filtration media 52 at minimum cost. The cylindrical configuration also enhances the friction between the various elements of the air filter arrangement 14 as discussed below.

Air filter arrangement 14 when assembled has top and bottom positioning members 98 and 100 frictionally held on outer and inner air filter media retainers 44 and 50 with outer air filter media retainer 44 adjacent fourth inner surface 110 of top and bottom positioning members 98 and 100 and inner air filter media retainer 50 adjacent fifth inner surface 116. Particulate filter 46 is adjacent seventh inner surface 120 of outer air filter media retainer 44 and retained in position by the friction between particulate filter 46, seventh inner surface 120, and granular activated carbon 48. Granular activated carbon 48 is confined in position by particulate filter 46, eighth inner surface 122 of outer filter media retainer 50, and third inner surfaces 104 of top and bottom positioning members 98 and 100.

Second particulate filter 42 surrounds seventh outer surface 118 of outer air filter media retainer 44 and is held in position by friction between the second particulate filter 42 and seventh outer surface 118, first and second inner surfaces 58 and 68 of top member 54, sixth inner surface 130 of bottom member 126, and third outer surfaces 102 of top and bottom positioning members 98 and 100. As such, top member 54 is adjacent top positioning member 98 and bottom member 126 is adjacent bottom positioning member 100.

Having now reviewed the above description and the drawings, those skilled in the art will realize that a wide variety of embodiments may be employed in producing equipment in accordance with the present invention. In many instances, such embodiments may not even resemble that depicted here and may be used for applications other than that shown and described. Nevertheless, such embodiments will employ the spirit and scope of the invention as set forth in the following claims.

I claim:

1. A portable fresh air fountain air filter arrangement for cleaning the ambient air in an enclosed space comprising, in combination:
   a top member having:
     a first outer surface;
     a first inner surface spaced transversely from said first outer surface; and
     first walls between said first outer and first inner surfaces defining first apertures through said top member;
   an air blower adjacent said top member and exhausting through said first apertures;
   a bottom member transversely spaced from said top member;
   an air filtration media extending from said top member to said bottom member and with said top and bottom members forming a cavity containing said air blower;
   attaching means retaining said top member to said bottom member through said cavity without contacting said air filtration media whereby said fresh air fountain air filter arrangement is held together as a unit only by the action of said attaching means in pulling said top and bottom members toward each other thereby retaining said air filtration media in position;
   said top member having a first outer lip at 90° to the plane of said first outer surface;
   said first outer lip having:
     a second outer surface; and
     a second inner surface spaced laterally from said second outer surface;
   an outer air filter media retainer;
   an inner air filter media retainer spaced laterally from said outer air filter media retainer;
   a top positioning member;
   a bottom positioning member spaced transversely from said top positioning member;
   said top and bottom positioning members having:
     a third outer surface;
     a third inner surface spaced transversely from said third outer surface;
     a second outer lip at 90° to the plane of said third outer surface having:
       a fourth outer surface; and
       a fourth inner surface spaced laterally from said fourth outer surface;
     an inner lip at 90° to the plane of said third outer surface having:
       a fifth outer surface; and
       a fifth inner surface spaced laterally from said fifth outer surface;

said bottom member having:
  a sixth outer surface;
  a sixth inner surface spaced transversely from said sixth outer surface; and
  a third outer lip at 90° to the plane of said sixth outer surface;
said top member adjacent said top positioning member;
said bottom member adjacent said bottom positioning member;
said outer air filter media retainer adjacent said fourth inner surface; and
said inner air filter media retainer adjacent said fifth inner surface;

2. The arrangement defined in claim 1 wherein;
said air filtration media has activated carbon and at least one particulate filter.

3. The arrangement defined in claim 2 wherein:
said activated carbon is granular.

4. The arrangement defined in claim 3 and further comprising:
said outer air filter media retainer having:
  a seventh outer surface; and
  a seventh inner surface spaced laterally from said seventh outer surface;
said inner air filter media retainer having:
  an eighth outer surface; and
  an eighth inner surface spaced laterally from said eighth outer surface;
said at least one particulate filter adjacent said seventh inner surface and retained in position by the friction between said at least one particulate filter and said seventh inner surface and by the friction between said at least one particulate filter and said granular activated carbon;
said granular activated carbon adjacent said at least one particulate filter, said eighth inner surface, and said third inner surfaces of said top and bottom positioning members;
said granular activated carbon confined in position by said at least one particulate filter, said eighth inner surface, and said third inner surfaces;
said top and bottom positioning members held onto said outer and inner air filter media retainers by friction;
said air blower attached to said top member;
said air blower having attaching means retaining said air blower to said bottom member;
said first inner surface of said top member adjacent said third outer surface of said top positioning member; and
said sixth inner surface of said bottom member adjacent said third outer surface of said bottom positioning member.

5. The arrangement defined in claim 4 wherein:
said first, second, and third outer lips and said inner lip are cylindrical; and
said outer and inner air filter media retainers are cylindrical and equidistant from each other.

6. The arrangement defined in claim 4 and further comprising:
a second particulate filter adjacent said seventh outer surface of said outer air filter media retainer and held in position by friction between said second particulate filter and said seventh outer surface, said first and second inner surfaces of said top member, said sixth inner surface of said bottom member, and said third outer surfaces of said top and bottom positioning members.

* * * * *